United States Patent [19]

Storgard

[11] Patent Number: 4,954,016
[45] Date of Patent: Sep. 4, 1990

[54] SEWER PIPE RELINING METHOD
[75] Inventor: Christer Storgard, Vasa, Finland
[73] Assignee: Oy Wiik & Hoglund AG, Vasa, Finland
[21] Appl. No.: 320,999
[22] Filed: Mar. 9, 1989
[30] Foreign Application Priority Data
Apr. 13, 1988 [CA] Canada .............................. 564,076-8
[51] Int. Cl.$^5$ .......................... F16L 55/18; F16L 9/22; E03F 3/06
[52] U.S. Cl. .................................... 405/184; 405/154; 405/150; 138/97; 285/15; 285/55
[58] Field of Search ............... 405/154, 184, 150, 151, 405/152, 153, 156; 138/93, 97, 98; 29/157 R; 285/15, 45, 55

[56] References Cited
U.S. PATENT DOCUMENTS

| | | | |
|---|---|---|---|
| 3,233,315 | 2/1966 | Levake | 405/154 X |
| 4,060,992 | 12/1977 | Heitkamp et al. | 405/154 X |
| 4,678,370 | 7/1987 | Allen | 405/154 |
| 4,724,108 | 2/1988 | Jurgenlohmann et al. | 405/154 X |
| 4,728,223 | 3/1988 | Rice | 405/154 |
| 4,796,669 | 1/1989 | Saint Onge | 138/97 |

FOREIGN PATENT DOCUMENTS

| | | | |
|---|---|---|---|
| 2537365 | 1/1977 | Fed. Rep. of Germany | 405/184 |
| 3127079 | 1/1983 | Fed. Rep. of Germany | 405/154 |

Primary Examiner—Randolph A. Reese
Assistant Examiner—John A. Ricci
Attorney, Agent, or Firm—Zarley, McKee, Thomte, Voorhees & Sease

[57] ABSTRACT

The present invention discloses apparatus and methods for relining sewer mains without excavation. The sewer main is accurately measured and pre-selected short sections of reliner pipe are inserted one at a time. Visual equipment and manipulative apparatus is provided which will orient lateral openings with lateral drains. The orientation sealing and grouting of the reliner pipe can be conducted after insertion so that crews can move ahead with relining other sections of the sewer.

4 Claims, 7 Drawing Sheets

SEWER PIPE RELINING METHOD

This invention relates to improvements in the relining of sewer pipes and the like. More particularly, it relates to improved apparatus and methods for installing a lining in existing sewer pipes having lateral connections running to adjacent buildings, usually underground.

Many older cities and the older parts of newer cities contain sanitary sewers and storm drains, usually composed of concrete pipe, which are deteriorating due to time, the effects of stress, and chemical erosion. These old pipes exhibit undesirable effects of decay, such as leaking of waste water into the soil, collapse and blockage. When these problems become severe enough they must be overcome in some manner.

Unfortunately, the conventional method of excavating the old pipes and replacing them with new ones has become excessively expensive. Furthermore, the disruption caused by excavating portions of already overly crowded city streets makes this kind of repair work very unpopular.

As a result, many ways of replacing or repairing sewer pipes insitu have been attempted. Some of these involved the grouting of decayed areas with new concrete but this is very difficult to accomplish at selected intervals along a narrow pipe and the results are often unsatisfactory.

More recently, attempts have been made to overcome the problems of deterioration by installing a new lining inside the old pipe. These techniques have been encouraged by the development of thermoplastic materials which provide a lining which is flexible, resilient and wear resistant. Furthermore, the strength of plastic piping permits a lining which serves all of the necessary purposes with a liner which has a thin wall and does not significantly reduce the capacity of the pipeline.

While techniques exist for installing such a liner through a manway of a sewer main, problems still remain with the difficulties presented by the need to provide openings and connections to lateral drainage lines which extend from buildings along the route of the sewer main.

In order to accommodate these lateral connections, it is necessary to determine their exact position and direction, provide precisely located openings in the sewer pipe liner corresponding to those lateral openings, and provide means by which those lateral drainage pipes can be connected to the main line with a substantially waterproof seal.

According to some techniques, the position of the lateral openings is precisely measured and the corresponding openings in the liner are cut before it is installed. This requires considerable precision and is subject to the problem that an error in any of the measurements will render the whole liner unusable.

According to another type of technique, individual sections of pipe are installed one at a time. Some form of measuring device is used to locate the position of the laterals and a carriage mechanism is used to advance, locate and orient the appropriate piece of pipe so that its opening is opposite the lateral connection. This method requires the manipulation of relatively heavy pieces of pipeliner by relatively small and delicate machine or carriage. Another difficulty arises from the fact that each operation must take place in sequence and the painstaking effort of orienting a pipeliner with a lateral opening will delay all the subsequent steps in installing other sections of pipeliner.

It is the purpose of the present invention to present a method and apparatus whereby lengths of plastic liner may be installed in an existing sewer pipe quickly and efficiently while providing means to locate and orient lateral openings at the proper position to connect lateral drain pipes to the main sewer pipe.

This can be accomplished by a method which comprises the steps of measuring a section of sewer pipe main to determine the length and the location of lateral openings, preparing short sections of reliner pipe adapted to fit together and match the measurements of the sewer main, install the reliner pipe sections at one end of the sewer pipe section by attaching each section of reliner pipe to the previous one and advancing the connected pieces along the sewer until the entire reliner pipe is in place, orienting the lateral openings of the reliner pipe with the lateral openings of the sewer main by means of equipment which comprises a television camera capable of viewing the position of the lateral openings of the inside surface of the reliner pipe, and moving sections of reliner pipe rotationally or longitudinally in order to line up the lateral openings of the reliner with the lateral openings of the sewer, inflating a collar adapted to seal the space between the old sewer main and the reliner pipe around each lateral opening.

The method has the advantage that relining can be conducted without excavating the sewer. Furthermore, the short sections of reliner pipe can all be inserted one after another until all of the reliner pipe is in place for a given section of the sewer main. The orientation of the lateral openings and other steps can be conducted later while the crews go on to install the reliner of pipe sections in other parts of the sewer main.

The invention may best be understood by a description of one embodiment thereof with the aid of the following drawings.

Figure 1:
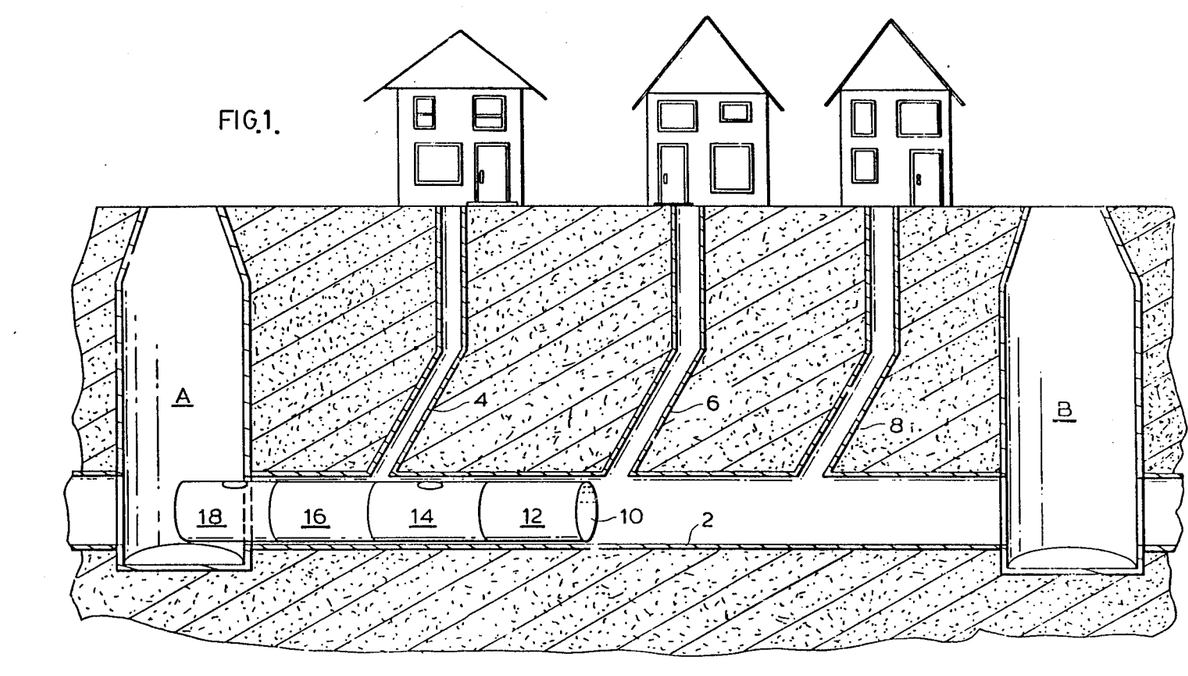
FIG. 1 is a diagrammatic illustration of a typical underground sewer system being relined in accordance with the present invention.

FIG. 1 illustrates a typical sewer system in which a section of sewer pipe, typically of concrete, extends between two manways A and B located at spaced intervals along the sewer main (which, of course, extends onward in each direction from the opposite sides of the manways A and B). The sewer main 2 has a series of lateral connections 4, 6 and 8 which are drainage pipes leading from houses along the street carrying sewage or rainwater from the houses to the main sewer line. In order to repair the sewer main, a liner 10 is employed and shown partially installed in FIG. 1.

The liner 10 is composed of a series of short lengths of plastic pipe 12, 14, 16 and 18 adapted to fit snugly together, each of which is small enough to be placed in position in the manway, as illustrated by piece 18, and preferably light enough to be manually handled by one or two workers.

By inserting a sufficient number of these short lengths of liner pipe, the complete liner may be advanced along the whole length of the sewer main from manway A to manway B.

Provision must be made, however, for the connection to the lateral drains, typically illustrated at 4, 6 and 8. This is done in accordance with the present invention by a method and the use of apparatus described hereinafter.

The first step in relining a section of pipe is to determine the length of pipe to be relined and the longitudinal location of the openings connecting to the laterals 4, 6 and 8.

Figure 2:
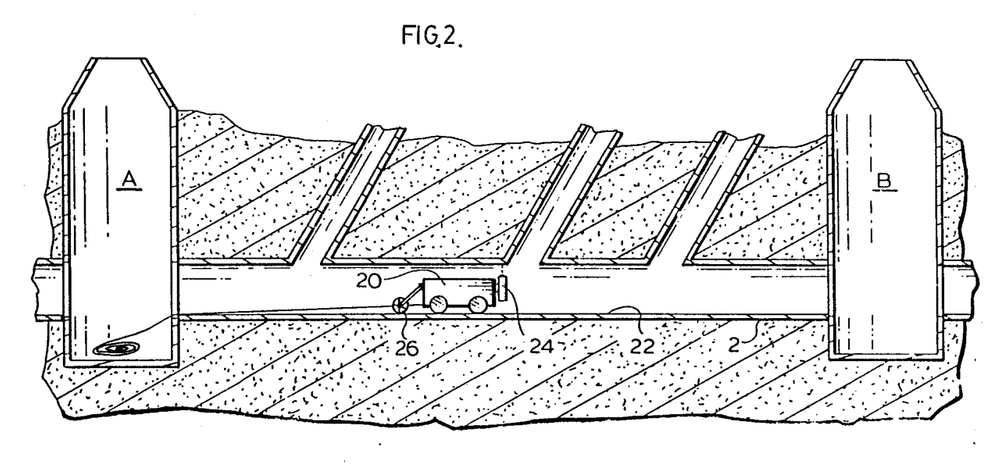
FIG. 2 illustrates the step of measuring the features of the sewer main.

In FIG. 2 the same piece of sewer main is illustrated extending between the manways A and B. The length and location of the laterals in this section of pipe may be determined by a measuring device, such as the vehicle 20 illustrated in FIG. 2, which may be a wheeled carriage or sled of some sort with means such as the string 22 to move it along the sewer pipe. In the embodiment illustrated, the vehicle has a television camera 24 aimed at the wall of the lengths of the pipe and capable of visually detecting either edge of a lateral opening, as illustrated. Also mounted on the carriage 20 is a measuring device which, in the illustrated embodiment, is a "fifth wheel" designed to electronically measure the distance travelled by the vehicle so that measurements along the length of the pipe can be tabulated to determine the overall length of the sewer pipe and the longitudinal distance to each of the lateral openings.

Once these longitudinal distances have been determined, the number and size of the individual pieces of liner pipe, as illustrated at 12, 14, 16 and 18 in FIG. 1, can be calculated, preferably by a computer program designed for the purpose. It is considered preferably, although not necessary, for the present invention, that the sections of pipe containing lateral openings, such as 14 and 18, will be of standard size or length with lateral openings which approximately correspond to the size of the lateral drains which are connected through these openings. The appropriate length of the liner pipe and the correct positioning of the lateral openings can then be achieved by using various lengths of ordinary pipe (without lateral openings) to fill out the lengths between laterals or between the laterals and the manway opening. In practice, it has been found that a sufficient variety of longitudinal dimensions can be accommodated by using lengths of "non-lateral" sections of 160, 190, 240 and 340 cm respectively. More precise positioning and spacing of the lateral openings can be achieved by means incorporated in the design of the liner pipe sections which will be described in greater detail later.

As previously mentioned, once the distance between lateral openings and manways have been determined, a suitable combination of reliner pipe sections can be assembled, including sections with lateral openings. These sections can then be lowered into the manway and pushed longitudinally into the sewer main in correct sequence until a liner extends from one manway to the other in the entire length of one section of the sewer main. Additional sections can then be relined in the same manner.

In order for this method to be effective, however, it is necessary that the reliner pipe sections be constructed in such a way that they will fit together forming a mechanical connection and a waterproof seal. It is also important that the reliner sections having lateral openings be capable of precise longitudinal positioning and radial orientation opposite the downstream end of the lateral drains. A third requirement is that the communication between the lateral drains and the lateral openings of the reliner pipe be sealed to prevent seepage into the surrounding soil or the gap between the old sewer main and the new liner.

Figure 3:
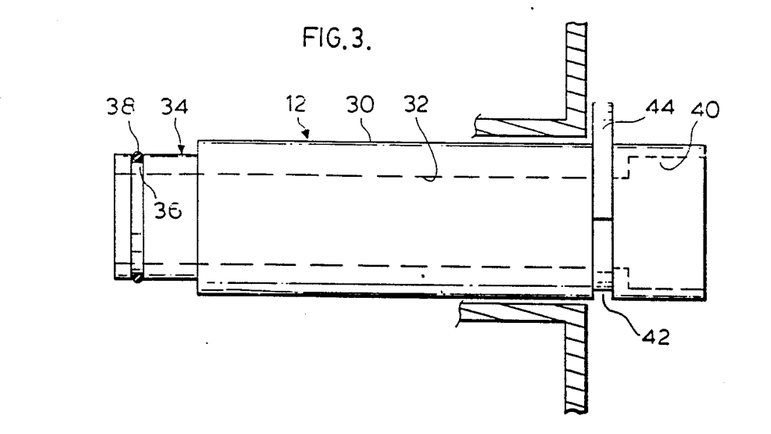
FIG. 3 illustrates a structure of a section of reliner pipe and the installation thereof.
Figure 4:
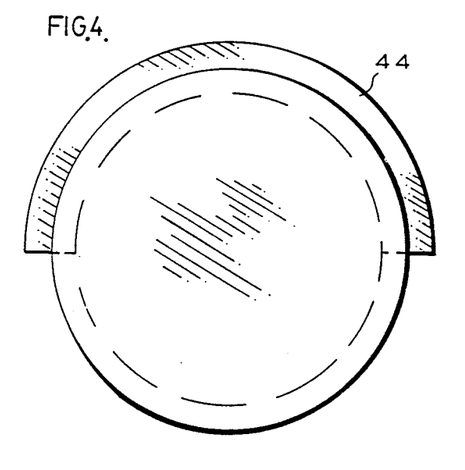
FIG. 4 is an end view of the section in FIG. 3.

To facilitate the mechanical connection and seal between individual reliner pipe sections, the sections are constructed in the manner illustrated in FIG. 3 and FIG. 4. In FIG. 3 the main body of the pipe section 12 has cylindrical outer surface 40 and a cylindrical inner bore 32. One end of the section has a male fitting 34 of reduced diameter having a length of about 5 to 7 cm with a recessed notch 36 adapted to receive an O-ring rubber seal 38.

The male connector end is adapted to fit within a female receptacle end of the next adjacent pipe section. This female end is illustrated in FIG. 3 as an enlarged internal bore 40 of a longitudinal dimension approximately equivalent to the male connector 34. Thus the male connector is mechanically held within the receptacle 40 and the O-ring 38 and forms a water-tight seal between the two sections of pipe.

It will be appreciated that some force is required to insert one pipe into the other and therefore to resist the pressure required a circumferential ring 42 is provided which will receive a semicircular yoke or collar 44 which is temporarily positioned within the groove and adapted to butt up against the end of the existing sewer main to provide resistance while the next length of pipe is being forced into connection with the previous piece. The collar 44 is then removed to allow the reliner pipe to be advanced one section length before connecting the next piece.

Except for the lateral openings, all such pieces are constructed in a similar manner, of a diameter suitable to fit within the sewer main, and of varying lengths to accommodate various distances and spacing.

Figure 5:
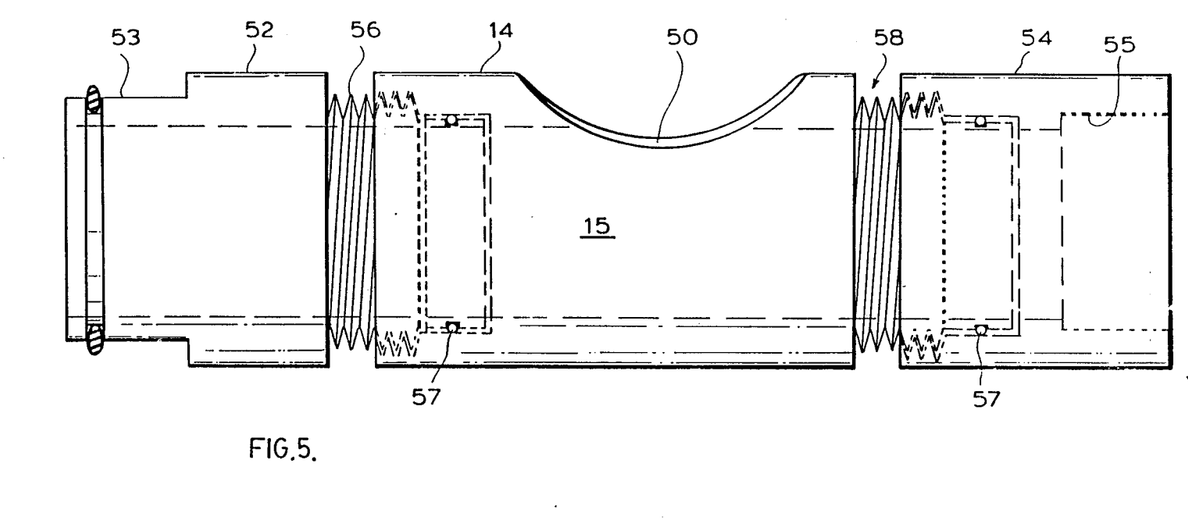
FIG. 5 is an illustration of a section of reliner pipe with an opening adapted to connect to a lateral drain.

The reliner sections which accommodate the lateral openings are substantially different to allow for the longitudinal positioning and radial orientation of the lateral opening. One type is illustrated in FIG. 5 in which the body of the section 14 containing the lateral opening 50 has separate end pieces 52 and 54 connected to the body portion by male/female threaded sections 56 and 58 respectively. The end portion 52 has a reduced outer diameter male connector 53, similar to the standard piece illustrated in FIG. 3, with a recess containing an O-ring adapted to fit into the female end of the next adjacent reliner pipe section. The other end 54 is provided with a corresponding female receptacle 55 provided by an enlarged internal bore section similar to that illustrated in FIG. 3. O-rings 57 are also used to seal the threaded connections 56 and 58.

It will be appreciated that threaded connections 56 and 58 will allow the length of this section to be adjusted. However, more importantly it should also be appreciated that after installation of a series of pieces, including section 14, as illustrated in FIG. 5, and after the end portions 52 and 54 are securely connected to adjacent sections such as 12 on either end thereof, the central portion 15 can be moved longitudinally by rotating it. Rotation in one direction will cause the threads 56 to be closed and the threads 58 to be opened. Rotation in the opposite direction will move the centre portion 15 in the opposite direction. Thus rotating the central portion 15 (by means to be described later) can be used to adjust the precise longitudinal position of the lateral opening 50, as well as the radial orientation.

Once the lateral opening of the reliner section is positioned in registration with the end of the lateral drainage pipe, it is necessary to seal this connection to prevent water and sewage from seeping into the surrounding soil and to prevent the encroachment of silt and soil into the sewer pipe.

Figure 6:
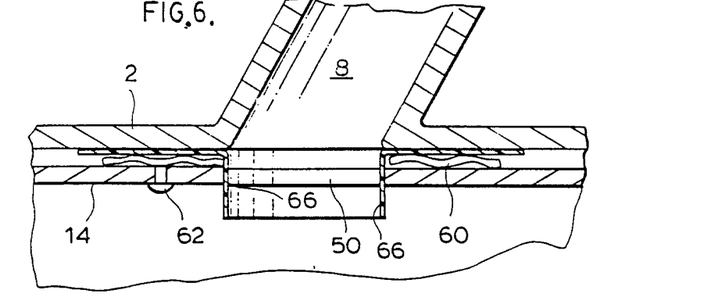
FIGS. 6 and 7 illustrate means by which a seal is installed around a lateral opening between a sewer pipe and a reliner pipe.

This is accomplished in accordance with the present invention by means of an inflatable collar and a restraining ring, as illustrated in FIG. 6.

Figure 8:
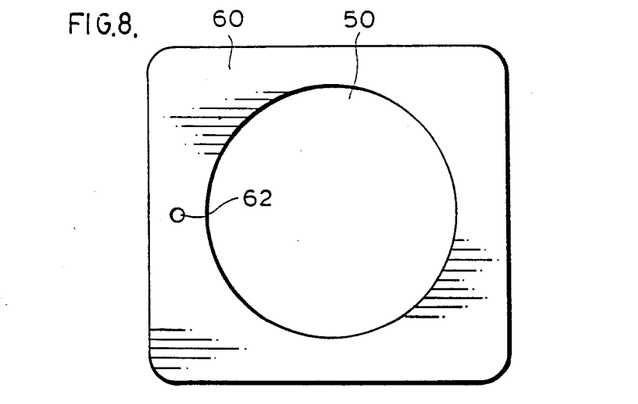
FIG. 8 illustrates a collar adapted for installing the seal illustrated in FIGS. 6 and 7.

FIG. 6 illustrates a section of the old sewer main 2, illustrated in FIG. 1, and a section of the reliner pipe 14 having a lateral opening 50 in registration with the opening of a lateral drain 8. The lateral opening 50 is surrounded by a collapsed, inflatable collar 60 having a valve 62 communicating with the inside of the reliner pipe section. The donut shape of the inflatable collar with the central opening conforming with the lateral opening 50 is illustrated in FIG. 8.

Figure 7:
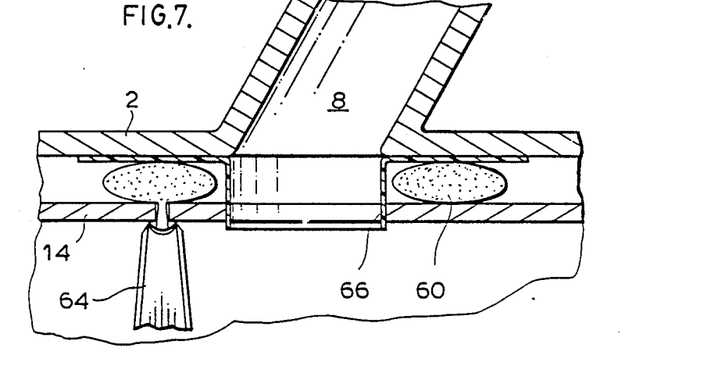

In FIG. 7 the same collar 60 is illustrated in the inflated configuration with a nozzle 64 in registration with the valve 62 so that a hardenable thermoplastic material may be injected into the collar through the nozzle 64 and the valve 62, which is preferably provided with a one-way valve or flap designed to allow the inflation of the collar and the injection of the thermoplastic resin without the material flowing back out when the nozzle is removed. As illustrated in FIG. 7, when the collar is inflated, it provides a seal filling the gap between the sewer main and the reliner pipe and surrounding the opening 50.

Also illustrated in FIGS. 6 and 7 is a restraining cuff 66 which has circular flange surrounding the opening 50 perpendicular to the axis of the sewer main and a second flange parallel to the walls of the sewer main overlying the inflatable collar. This cuff serves to protect the inflatable collar when the pipe is being installed and rubs along the existing sewer pipe and further serves to keep the cuff in its location relative to the lateral opening 50. Later, when the cuff is inflated, the walls of the cuff 66 serve to prevent the cuff from being forced out into the lateral opening 50 under the pressure of inflation. While the circular wall of the cuff 66 tends to project into the interior of the reliner pipe in the position illustrated in FIG. 6, inflation of the collar will tend to lift the cuff so that it no longer projects substantially into the interior of the pipe.

It has previously been explained how the appropriate lengths of reliner pipe are determined and are installed in proper sequence from one end of the section of sewer main to the other. Once in place, it is necessary to position and orient the lateral opening sections, such as 14, in the precise registration with the opening of the drainage laterals, as illustrated in FIGS. 6 and 7.

Because these lateral openings are some distance from the manways, this step can best be accomplished by a remote controlled manipulating device, the construction and function of which is described hereinafter.

Figure 9:
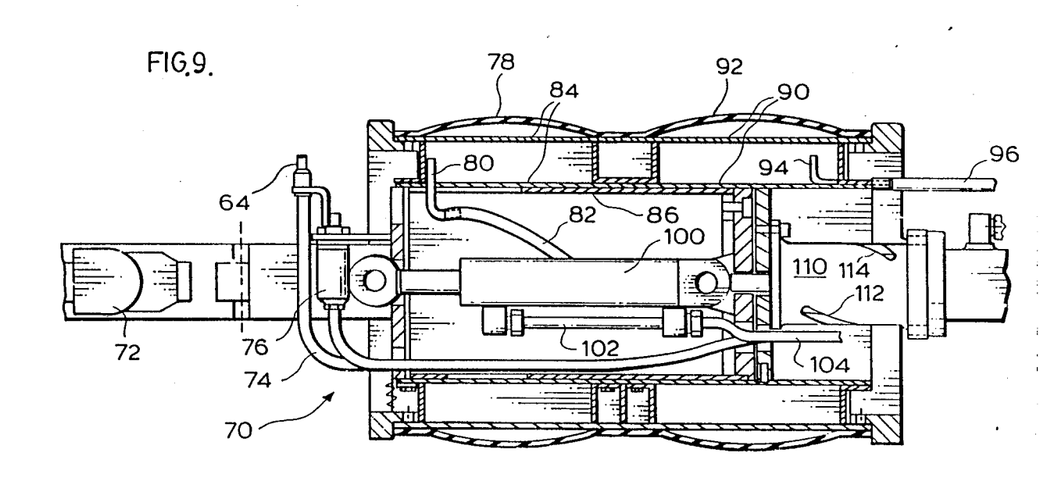
FIG. 9 illustrates a piece of equipment by which sections of the reliner pipe may be manipulated.

One method uses a device illustrated in FIG. 9 which is a cross sectional elevation of one embodiment of a manipulating device suitable for use in accordance with the present invention.

This manipulating device, generally referred to by reference number 70, contains at one end a closed circuit television camera 72 which ideally is capable of aiming in a variety of forward, lateral, and rearward directions under remote control. Most importantly for the present invention, the camera should be capable of being directly laterally in a direction approximately (or precisely) at 90° to the axis of the device which is parallel to the axis of the sewer pipe. In addition, the camera should be capable of rotation radially about the central axis so as to be able to view and locate various points on the inner periphery of the sewer pipe or the reliner.

Next, adjacent to the television camera is a nozzle 64 connected by means of a hose 74 to a source of fluid or the ingredient of a thermoplastic resin such as polyurethane. The nozzle is intended to move in response to the air cylinder 76 from the recessed position illustrated in FIG. 9 in an axial direction to a position engaging the valve of the inflatable collar, as illustrated in FIG. 7.

Immediately rearward of the nozzle 64 and the air cylinder 76 is a first inflatable packer 78 which extends around the circumference of the device and is designed to engage the inner wall of a reliner pipe when inflated by means of fluid injected under pressure through the nozzle 80 which is connected to a source of fluid by a hose 82. The packer 78 is mounted on and sealed against a ring 84 which extends circumferentially around the axis of the device and fits snugly on an inner sleeve 86 which is coaxial with the ring 84.

The inner sleeve 86 extends beyond the rearward extremity of the ring 84 and the first packer 78 is coaxially surmounted by a second ring 90 having a second packer 92 mounted thereon and adapted to engage the inner walls of a reliner pipe when inflated by fluid under pressure injected through the nozzle 94 connected to a source of fluid by the hose 96.

The two packers 78 and 92 are maintained in axial alignment by the fact that they are both mounted on a common inner sleeve 86 but are otherwise capable of being moved in an axial direction relative one to the other by means of a hydraulic cylinder 100 which is capable of extension or contraction under the influence of fluid under pressure through lines 102 and 104 respectively.

Rearward of the hydraulic cylinder 100 a turning sleeve 110 having a set of diagonally oriented slots 112 and 114 cut in the wall thereof and adapted to receive the lugs of an internally operable shaft activated by means of another hydraulic cylinder in an axial direction whereby the sleeve 110 will be caused to rotate.

Once the reliner sections are in place, as previously mentioned, the manipulator device is used in the following manner.

The device can be inserted inside the reliner pipe and pushed by means of a stiff rod or pulled by means of a line to the location of one of the lateral connections where a lateral opening in the reliner pipe will be approximately positioned. The television camera oriented in the direction perpendicular to the axis can be rotated in a radial plane to locate the lateral opening and to determine whether it is more or less where desired. Assuming it needs to be more precisely positioned, the device can be maneuvered until one of the packers is located within the lateral opening section 14 and the adjacent packer is within the next adjacent piece or one of the end pieces 52 or 54. The packers 78 and 92 can then be inflated so that they each engage the respective sections of the reliner pipe. By activating a hydraulic cylinder within the tuning sleeve 110, the central portion 50 of the lateral opening section 14 can then be rotated. It can be rotated a few degrees as may be necessary to align the lateral opening 50 with the end of the drainage pipe to which it is to be connected. Alternatively, if the lateral opening 50 needs to be adjusted in an axial direction, the turning sleeve 110 can be activated a series of times (in each sequence it will be necessary to release and re-engage one of the packers 78 or 92), and in this manner the central portion 15 can be turned one or two or more rotations in one direction or the other so as to move the piece laterally by means of the threads 56 and 58.

Once the lateral opening piece 15 has been located in the correct longitudinal location and axial orientation, the nozzle 74 can be located, with the visual aid of the television camera directed somewhat rearwardly, to line up with the valve of the inflatable collar, as shown in FIG. 7. The nozzle 74 can be moved in a radial direction by means of the turning cylinder 110 with the packer 78 disengaged and longitudinally by means of the hydraulic cylinder 100. Once it is in proper alignment the cylinder 76 is activated to move the nozzle 74 into engagement with the valve 62.

Once engaged, the thermoplastic material is injected through the hose 75, the nozzle 74, the valve 62 and into the interior of the inflatable collar 60 where it inflates the collar and moves the cuff 66 into the retracted position, all as shown in FIG. 7.

Once the polyurethane has set in the inflatable collar, it is often considered desirable to grout the annular space between the old sewer main and the reliner pipe with light weight foamed cement pumped in from either end of the sewer section.

Figures 10, 11:
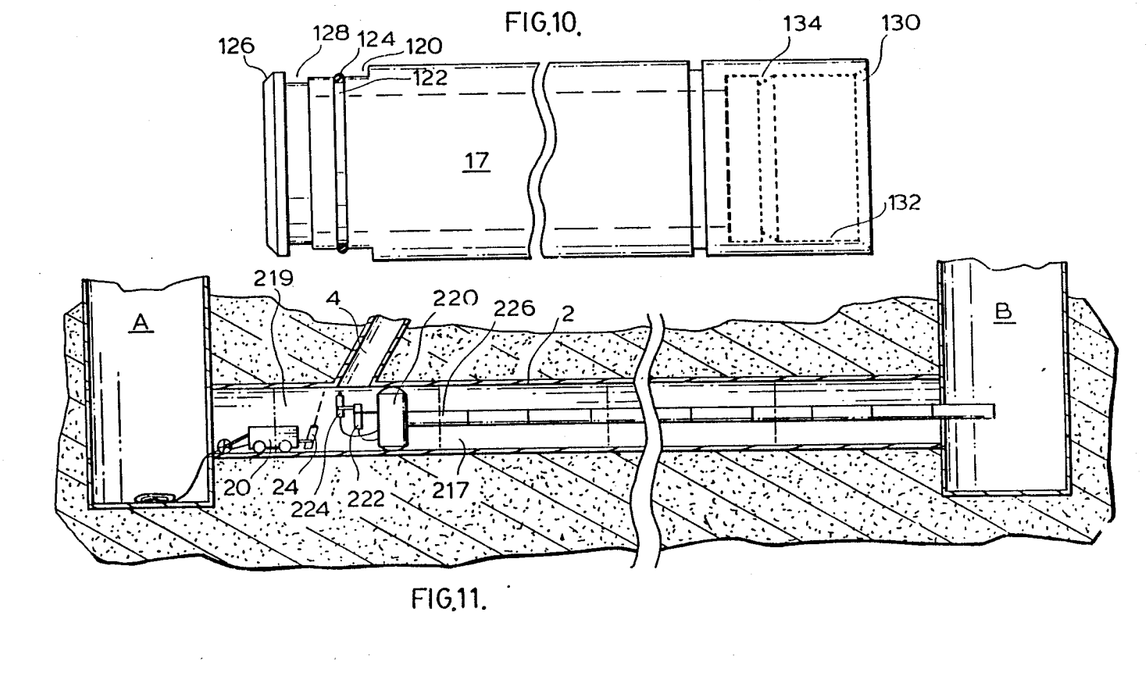
FIG. 10 illustrates another design for a section of reliner pipe.
FIG. 11 illustrates an alternative method of orienting and locating sections of the reliner pipe.

The second method which embodies the present invention is illustrated in FIGS. 10 and 11 showing modified apparatus and method for installing the pipeliner.

FIG. 10 shows a length of typical reliner pipe section similar to those illustrated at 12, 14, 16 and 18 in FIG. 1, (either with or without lateral openings), but modified in the means by which they are connected. In the illustrated pipe section 17 the male end comprises a reduced section 120 having a notch 122 with an O-ring 124 adapted to seal against the female end of the next adjacent pipe. Further along, towards the tapered end 126, is a larger recess 128 which has a considerable longitudinal dimension.

At the other end the female opening is tapered at 130 and has a bore 132 adapted to receive the male end of the next adjacent pipe snugly around the O-ring 124 to create a seal. Positioned in from the end is a raised rib 134 tapered inwardly towards the middle and having a sharp perpendicular termination at its inner edge. This ring is intended to pass snugly over the tapered end 126 and fit into the recess 128 where it firmly engages the adjacent pipe. However, the lateral dimension of the notch 128 provides for some longitudinal movement between the adjacent pipes (without disconnecting or interrupting the seal) for reasons described below.

In FIG. 11 a method of installation is illustrated which varies from the first embodiment and employs reliner pipe sections, such as 17 illustrated in FIG. 10. In FIG. 11 a section of sewer main extending between manholes A and B (as in FIG. 1) has sections of reliner pipe 217, 219 in place. Section 219 contains a lateral opening which must be oriented with the lateral drain 4. This is accomplished by an inflatable packer 220 which engages the inner wall of the pipe when inflated, similar to that illustrated in FIG. 9, although much simpler.

This packer has an air cylinder 222 and a nozzle 224 designed to feed hardenable thermoplastic resin to the collar 60 in the same manner illustrated in FIGS. 6 and 7 and described above. The other end of the packer is designed to receive a series of threaded (or otherwise connectable) links of pipe 226 which extend along the inside of the relining pipe to the manhole B. These lengths of pipe provide a sort of handle by which the packer 220 can be inserted and pushed along the reliner pipe to the appropriate position, as shown in FIG. 11.

Once the packer 220 is inflated the small diameter pipe 226 can be used to rotate the reliner pipe 219 radially so as to align it with the opening of the lateral drain 4 and can also be used to push or pull the pipe section 219 to align it longitudinally. Although the reliner pipes are installed and connected, the longitudinal dimension of the notch 128 into which is engaged the ridge 134, allows a certain amount of longitudinal movement. Although this movement is slight, it is cumulative and therefore if a series of ten pipes, each have a movement of 45 mm, a total of adjustment of 450 mm is possible.

As in FIG. 2, the alignment can be monitored by the television camera 24 and the reliner pipe can be grouted in place by foamed cement as in the previously described method.

This method, however, is simpler and requires less sophisticated equipment and is therefore easier to perform, especially where the reliner pipes are smaller, lighter, and easier to move.

Thus, by means of the techniques and equipment described in the foregoing paragraphs, the operation of relining an old and decaying sewer main can be accomplished relatively quickly and inexpensively without the requirement for excavation and replacement of lines or the use of excessively heavy equipment.

Furthermore, the reliner sections can be inserted quite quickly from one manway to another. The operation of inserting reliners in the next section of the sewer main can go on without waiting for each individual lateral opening section to be oriented, sealed and grouted before the next section of pipe can be installed as is the case in many other methods.

Furthermore, once the alignment of the lateral openings has been achieved, a connection can be sealed by means of the inflated collar and the retaining cuff so as to provide an effective seal.

I claim:

1. In a method for the repair of sewer mains having lateral openings with reliner pipe by the steps of:
   measuring a section of sewer main to determine the length thereof and location of lateral openings;
   preparing short lengths of reliner pipe adapted to fit together and conform with the measurements of the sewer mains;
   providing certain sections of reliner pipes with lateral openings corresponding to the lateral openings in the sewer main;
   inserting the aforesaid lengths in sequence and advancing the connected sections through the sewer main until the reliner pipe extends through the entire section of the sewer main;
   the improvement which comprises adapting the lengths of reliner pipe which have lateral openings to fit together with adjacent lengths of reliner pipe by means which will allow circumferential and longitudinal adjustment of the reliner lateral openings relative to the sewer main lateral openings by rotation of said lateral opening reliner pipe lengths after the reliner pipe has been installed throughout the entire section of the sewer main.

2. The improvement as claimed in claim 1 in which the adjustment of the reliner pipe lateral opening is achieved by threaded means connecting each end of a lateral opening length of reliner pipe with adjacent lengths of reliner pipe.

3. The improved method as claimed in claims 1 or 2 in which the communication between the reliner lateral opening and the sewer main lateral opening is sealed by an inflatable collar mounted on the reliner pipe and surrounding the reliner lateral opening and adapted to be injected by a hardenable thermoplastic resin.

4. The improved method as claimed in claim 3 in which said collar is protected and positioned by a cuff having a flange parallel to the wall of the reliner pipe overlying the collar, and having an opening corresponding with the lateral opening of the reliner length, and a tubular flange extending radially inward perpendicular to the axis of the reliner pipe and surrounding the opening in said cuff.

* * * * *